US010152354B2

(12) United States Patent
Chew et al.

(10) Patent No.: US 10,152,354 B2
(45) Date of Patent: Dec. 11, 2018

(54) OPTIMIZED THREAD SCHEDULING ON PROCESSOR HARDWARE WITH PERFORMANCE-RELEVANT SHARED HARDWARE COMPONENTS

(71) Applicant: Oracle International Corporation, Redwood Shores, CA (US)

(72) Inventors: Jonathan Chew, San Francisco, CA (US); Nicolas Michael, San Francisco, CA (US); Junsang Cho, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 121 days.

(21) Appl. No.: 15/445,907

(22) Filed: Feb. 28, 2017

(65) Prior Publication Data
US 2018/0246767 A1     Aug. 30, 2018

(51) Int. Cl.
*G06F 9/50* (2006.01)
*G06F 9/48* (2006.01)

(52) U.S. Cl.
CPC .......... *G06F 9/5044* (2013.01); *G06F 9/4843* (2013.01); *G06F 2209/483* (2013.01); *G06F 2209/501* (2013.01)

(58) Field of Classification Search
CPC ..................................................... G06F 9/5044
See application file for complete search history.

(56) References Cited

U.S. PATENT DOCUMENTS

| 2009/0138883 A1* | 5/2009 | McLean | G06F 9/50 718/104 |
| 2011/0061057 A1* | 3/2011 | Harris | G06F 9/5072 718/104 |

* cited by examiner

*Primary Examiner* — Sisley N Kim
(74) *Attorney, Agent, or Firm* — Trellis IP Law Group, PC (57) ABSTRACT

To schedule a software thread for execution on a CPU in a multiprocessor system, a scheduler uses both software and hardware utilization information. For a thread, resource demands (including software and hardware resource demands) are determined based on measuring resource usage while the thread executes on the multiprocessor system without being isolated from any other threads that may run concurrently. For at least two processor cores, resource usage is calculated based on any threads already running on it. The software thread is assigned to a strand in the processor core with optimum available resources given the thread's resource demands.

18 Claims, 6 Drawing Sheets

// Step 510 – Determining software usage and capacity
// Expressed as single values for running thread count
sw_usg_here   = software_usage(here_pg)        sw_usg_there  = software_usage(there_pg)
sw_cap_here   = software_capacity(here_pg)     sw_cap_there  = software_capacity(there_pg)

// Step 520 – Determining hardware usage and capacity
// Expressed as vectors with one value per hardware resource
hw_usg_here[]  = hardware_usage(here_pg)       hw_usg_there[]  = hardware_usage(there_pg)
hw_cap_here[]  = hardware_capacity(here_pg)    hw_cap_there[]  = hardware_capacity(there_pg)

// Step 530 – Determining software & hardware resource demands of thread to be scheduled
sw_need_thr    = software_resource_demand(T)
hw_need_thr[]  = hardware_resource_demand(T)

// Step 540 – Determining if exactly one of the PGs has insufficient software capacity
if (sw_usg_there + sw_need_thr > sw_cap_there &&
    sw_usg_here  + sw_need_thr <= sw_cap_here)    // not enough software capacity in there_pg
                                                  // thread can run here immediately
    choose here_pg else if (sw_usg_here  + sw_need_thr > sw_cap_here &&
         sw_usg_there + sw_need_thr <= sw_cap_there) // not enough software capacity in here_pg
                                                     // thread can run there immediately
    choose there_pg
```

Fig. 5 (continued on next page)

```
// Step 550—Determining if one of the PGs has less hardware resource contention than the other
else if (max(hw_usg_there + hw_need_thr - hw_cap_there) >
         max(hw_usg_here + hw_need_thr - hw_cap_here))    // compare maximum hardware usage
    choose here_pg                                         // least hardware resource contention else if (max(hw_usg_here + hw_need_thr - hw_cap_here) >
         max(hw_usg_there + hw_need_thr - hw_cap_there))  // compare maximum hardware usage
    choose there_pg                                        // least hardware contention // Step 560—Determining if one of the PGs has better average excess hardware capacity
else if (avg(hw_cap_there - hw_usg_there - hw_need_thr) >
         avg(hw_cap_here - hw_usg_here - hw_need_thr))    // compare average excess capacity
    choose there_pg                                        // lower average excess capacity else if (avg(hw_cap_here - hw_usg_here - hw_need_thr) >
         avg(hw_cap_there - hw_usg_there - hw_need_thr))  // compare average excess capacity
    choose here_pg                                         // lower average excess capacity // Step 570—Selecting the PG with the lowest software usage
else if (sw_usg_here - sw_cap_here <=
         sw_usg_there - sw_cap_there)                     // compare software usage
    choose here_pg                                         // lower or equal software usage
else
    choose there_pg                                        // lower software usage
```

Fig. 5 (continued)

OPTIMIZED THREAD SCHEDULING ON PROCESSOR HARDWARE WITH PERFORMANCE-RELEVANT SHARED HARDWARE COMPONENTS

BACKGROUND

The present invention relates to scheduling software threads on multiprocessor systems with shared hardware resources. Scheduling (sometimes called placement) software is usually part of an operating system that runs on the computer systems that it manages. A software thread is a self-contained sequence of program instructions that may work with a self-contained set of data values. Multiple software threads running in a single software program may also share data.

Traditionally, processor chips such as used in computers and many other electronics systems had a single processor core, including a central processing unit (CPU), an instruction pipeline, and usually a cache memory. In the context of this document, a CPU may also be referred to as a strand, where the strand contains the execution state of a running software thread and may include a set of registers.

As processor technology evolved, processor manufacturers introduced processor cores with multiple strands that share common resources such as the instruction pipeline and the cache memory. Each of the multiple strands could run a thread, so that multiple threads could be executed concurrently on one processor core. This technique is called Simultaneous Multithreading (SMT).

Evolution in processor technology also led to processor chips that included multiple processor cores, each with a single strand, an instruction pipeline, and a first-level cache, with the multiple cores often sharing a second-level cache. This technique is called Chip Multiprocessing (CMP).

Many modern processors combine both SMT and CMP in a single chip with multiple processor cores and multiple strands per core. Each core typically has its own dedicated instruction pipeline and first-level cache, while second- and/or third-level caches are often shared by some or all cores of the chip. This technique is sometimes referred to as Chip Multithreading (CMT).

Processors may include other performance-relevant hardware components on the chip such as translation lookaside buffers (TLB), floating-point units, graphics units, co-processors, cryptographic units, accelerators, or memory controllers. Each of these resources may be integrated into each core or shared by a group of cores or all cores of the chip.

U.S. Pat. No. 8,156,495, "Scheduling Threads on Processors" by Chew and Saxe, describes a processor group (PG) along with an abstraction to model the (potentially hierarchical) resource-sharing relationships of modern SMT/CMP processors. A PG is a group of CPUs (strands) that share one or more performance-relevant hardware resources. Multiprocessor hardware may be modeled as a hierarchical tree of PGs to describe simple or complex sharing relationships, for example CPUs of a core sharing a common execution pipeline and first-level cache in leaf PGs, or CPUs of multiple cores sharing a common second-level cache (but different execution pipelines and first-level caches) in an intermediate or root PG.

Operating systems implement schedulers and dispatchers (commonly referred to as schedulers in this document) that place software threads onto hardware strands (or CPUs) for execution. Traditional schedulers have treated all CPUs of a computer system identically and ignored the performance-relevant hardware-sharing relationships of CPUs (for example, some CPUs sharing a particular hardware resource while some other CPUs do not).

This problem has been recognized for some time. Various parties have created approaches to address the problem. One such approach has been described in the above patent by Chew and Saxe, using PG modeling to facilitate thread scheduling while considering the hardware resource sharing relationships of CPUs. In this approach, the usage of a PG is defined as the number of running threads in that PG, and is incremented by one (for a leaf PG and all its parent PGs) when a thread starts to execute in that leaf PG, and decremented by one (for a leaf PG and all its parent PGs) when a thread stops to execute in that leaf PG. The capacity of a PG is defined as the number of strands (CPUs) in that PG. This approach further implements two load-balancing policies to determine the best PG for a thread to execute on, either traversing the PG hierarchy top-down to globally balance utilization, or bottom-up starting the search with the PG the thread last executed on to optimize for locality. For both policies, at each level of the PG hierarchy, the utilization of the PG under consideration is compared with one or multiple of its sibling PGs, each time choosing the lower-utilized PG (that is, the PG with the lower running-thread count).

However, even though some current operating system schedulers are aware of the hardware resource sharing-relationships of the CPUs in the system, they only implement scheduling policies (such as load-balancing) based on running thread count ("software utilization") in each PG, but do not consider the actual resource usage of the PG's hardware components such as execution pipelines and caches. Furthermore, they assume all software threads to be identical with respect to hardware resource consumption, ignoring that some threads may have for example a higher demand for some hardware resource while other threads have a higher demand for other hardware resources. For example, one thread may have a higher demand for execution pipeline, resulting in a high rate of committed instructions per cycle (IPC), while another thread may have a higher demand for cache and memory, resulting in more memory-related stalls and consequently a lower rate of committed instructions per cycle (low IPC).

If scheduling policies do not consider the resource utilization of shared hardware components and the hardware resource demand of threads, thread scheduling decisions may be suboptimal. For example, schedulers may place two threads with a high demand for execution pipeline on the same core, and place two threads with a high rate of memory accesses onto another core. If each core has a dedicated execution pipeline and first-level cache, such a scheduling may lead to contention on the execution pipeline on one core and contention or a high first-level cache miss rate on the other core, while the complementary resource (first-level cache on the first core, execution pipeline on the second core) might remain underutilized. Such a thread scheduling may result in poor performance for applications as their thread's performance is degraded due to contention on shared hardware resources and the processor's resources are used suboptimally.

Current processors are built with CPU hardware performance counters (CPCs) that provide information regarding the usage or utilization of the various shared hardware resources ("hardware usage" or "hardware utilization"). Through sampling of these counters, a scheduler may also obtain information about the hardware resource consumption of threads or applications executing on a system.

Previous research has proposed deploying applications on so-called staging systems to obtain their hardware resource consumption profiles, and then use those profiles to optimize their scheduling on production systems. However, this approach may be impractical because the cost or effort of running and profiling an application on a staging system is not feasible. The application characteristics may change over time or its traffic pattern or type of use is unknown upfront, or staging and production systems may be based on different hardware platforms or generations. Especially with the evolution of cloud computing where application ownership is in the hands of a tenant, while the application scheduling is performed by the service provider, a dedicated staging or profiling phase is often impractical.

Furthermore, application may be heterogeneous, in themselves comprised of threads with different hardware resource requirements. While scheduling of applications is an infrequent task (for example during application deployment), scheduling of threads may need to be performed at every context switch, which is potentially thousands or millions of times each second. The profiling of individual threads in isolation is even more cumbersome than the profiling of entire applications in isolation.

SUMMARY

In a multi-processor system, such as a chip multithreaded (CMT) processor, conventional methods of thread scheduling based on "software utilization" (running-thread-count) are no longer adequate. Strands (or central processing units (CPUs)) may share hardware resources such as an execution pipeline, a floating-point unit (FPU), and a first-level cache, within a processor core. Processor cores may share hardware resources such as a second-level or third-level cache or memory controller within a processor chip, and processor chips may share hardware resources such as interconnects with other processor chips. Any of the shared hardware resources may matter for performance. When such a performance-relevant shared hardware resource is overloaded, all strands using it—and consequently software threads executing on these strands—will suffer degraded performance as they compete for shared hardware resources. Current processor hardware may provide hardware utilization information, for example, through programmable CPU hardware performance counters (CPCs), enabling operating systems, hypervisors, or other management software to measure hardware resource utilization, sample a thread's hardware resource consumption vector and estimate its hardware resource demand vector. By utilizing this information, operating systems, hypervisors, other management software, or tools can improve thread or application scheduling decisions to minimize hardware resource contention, minimize power consumption, maximize execution efficiency, and improve overall application performance.

In a first aspect, embodiments of the present invention provide a method for scheduling a first software thread for execution on a hardware system. The hardware system comprises at least a first processor group and a second processor group. Each of the processor group comprises at least two strands each capable of executing the first software thread. The first processor group has access to a first hardware component and the second processor group has access to a second hardware component. The first and second hardware components each offer a first functionality via their processor groups' respective strands. The method comprises the following steps. For the first software thread, determining a first software resource demand including a count of strands that needs to be unused and available in a processor group to execute the first software thread. For the first software thread, determining a first functionality hardware resource demand including an amount of usage needed of the first functionality, wherein the determining occurs while the first software thread is operational in the hardware system without isolating the first software thread from an optional second software thread that may be operational on the hardware system along with the first software thread and the determining uses usage information provided by the hardware system. For the first software thread, determining a thread resource demand vector including an entry for the first software resource demand and an entry for the first functionality hardware resource demand. For each the first processor group and the second processor group, determining a calculated usage vector that includes an entry representing a count of used strands and an entry representing an aggregated usage of the first functionality. For each the first processor group and the second processor group, determining a capacity vector that includes an entry representing a count of total strands and an entry representing a capacity of the first functionality. Based on the first processor group calculated usage vector and capacity vector, and the second processor group calculated usage vector and capacity vector, and based on the thread resource demand vector, assigning the first software thread to one of a strand in the first processor group and a strand in the second processor group and executing the first software thread on the strand to which it is assigned.

Embodiments may include the method in an operating system that is executed on the hardware system. Embodiments may further combine the calculated usage vector and the capacity vector in a calculated utilization vector. They may store utilization information as a number representing a percentage range. Embodiments may further comprise determining a second functionality hardware resource demand for the first software thread, including an amount of usage needed of a second functionality, wherein the determining occurs while the first software thread is operational in the hardware system along with at least a third software thread and the determining uses usage information provided by the hardware system; including an entry for the second functionality hardware resource demand in the thread resource demand vector; and including entries in the calculated usage vector and the capacity vectors representing aggregated usages and capacities of the second functionality.

In a second aspect, an embodiment of the invention provides a method for scheduling a software thread for execution on a hardware system comprising at least a first processor group and a second processor group, wherein the first processor group has access to a first hardware component, and the second processor group has access to a second hardware component, the first and the second hardware components each offering a first functionality, the method comprising the following steps: (a) for the first processor group, determining a first software capacity and a first software usage, wherein the first software capacity includes a number of strands capable of executing the software thread and the first software usage includes a number of strands that the first processor group presently uses for executing other software threads; (b) for the second processor group, determining a second software capacity and a second software usage, wherein the second software capacity includes a number of strands capable of executing the software thread and the second software usage includes a number of strands that the second processor group presently uses for executing other software threads; (c) for the first processor group, determining a first hardware capacity and a first hardware usage, wherein the first hardware capacity includes a value related to a presence of the first hardware component and the first hardware usage includes a value related to a present usage of the first hardware component; (d) for the second processor group, determining a second hardware capacity and a second hardware usage, wherein the second hardware capacity includes a value related to a presence of the second hardware component and the second hardware usage includes a value related to a present usage of the second hardware component; (e) for the software thread, determining a software resource demand and a software thread hardware resources demand, wherein the software resource demand includes a number of strands needed for executing the software thread, and the software thread hardware resources demand includes a value related to a required usage of a hardware component offering the first functionality; (f) determining if exactly one of the first and the second processor group has insufficient software capacity to execute the software thread immediately, by: (f.i) determining if the first software usage plus the software resource demand exceeds the first software capacity; (f. ii) determining if the second software usage plus the software resource demand exceeds the second software capacity; (f. iii) upon determining that the first software usage plus the software resource demand exceeds the first software capacity while the second software usage plus the software resource demand does not exceed the second software capacity, scheduling and executing the software thread on the second processor group and skipping further steps in the method; (f. iv) upon determining that the second software usage plus the software resource demand exceeds the second software capacity while the first software usage plus the software resource demand does not exceed the first software capacity, scheduling and executing the software thread on the first processor group and skipping further steps in the method; (g) determining if one of the first and the second processor group will have less hardware resource contention than the other when executing the software thread by: (g.i) determining a first hardware component contention by adding the first hardware usage plus the software thread hardware resources demand value related to the required usage of a hardware component offering the first functionality and subtracting the first hardware capacity value related to a presence of the first hardware component; (g.ii) determining a second hardware component contention by adding the second hardware usage plus the software thread hardware resources demand value related to the required usage of a hardware component offering the first functionality and subtracting the second hardware capacity value related to a presence of the second hardware component; (g.iii) determining if the first hardware component contention is larger than the second hardware component contention; (g.iv) upon determining that the first hardware component contention is larger than the second hardware component contention, scheduling and executing the software thread on the second processor group and skipping further steps in the method; (g.v) determining if the second hardware component contention is larger than the first hardware component contention; (g.vi) upon determining that the second hardware component contention is larger than the first hardware component contention, scheduling and executing the software thread on the first processor group and skipping further steps in the method; (h) determining if the first software capacity is higher than or equal to the second software capacity; (i) upon determining that the first software capacity is higher than or equal to the second software capacity, scheduling and executing the software thread on the first processor group; and (j) upon determining that the first software capacity is not higher than or equal to the second software capacity, scheduling and executing the software thread on the second processor group.

Embodiments may include the method in an operating system that is executed on the hardware system. Embodiments may further comprise for step (g): (g.vii) determining a third hardware component contention and a fourth hardware component contention; (g.viii) determining a first maximum of the first hardware component contention and the third hardware component contention; (g.ix) determining a second maximum of the third hardware component contention and the fourth hardware component contention; (g.x) scheduling and executing the software thread on the first processor group if the first maximum is lower than the second maximum; and (g.xi) scheduling and executing the software thread on the second processor group if the second maximum is lower than the first maximum. Embodiments may precede step (h) with: (k) determining if one of the first and the second processor group will have better average excess hardware capacity than the other when executing the software thread by: (i) determining a first hardware component excess hardware capacity by subtracting the value related to the present usage of the first hardware component from the first hardware capacity value and further subtracting the software thread hardware resources demand value related to the required usage of a hardware component offering the first functionality; (ii) determining a second hardware component excess hardware capacity by subtracting the value related to the present usage of the second hardware component from the second hardware capacity value and further subtracting the software thread hardware resources demand value related to the required usage of a hardware component offering the first functionality; (iii) determining a first processor group average excess hardware capacity by averaging the first hardware component excess hardware capacity and the second hardware component excess hardware capacity; (iv) determining a third hardware component excess hardware capacity by subtracting the value related to the present usage of the third hardware component from the third hardware capacity value and further subtracting the software thread hardware resources demand value related to the required usage of a hardware component offering the second functionality; (v) determining a fourth hardware component excess hardware capacity by subtracting the value related to the present usage of the fourth hardware component from the fourth hardware capacity value and further subtracting the software thread hardware resources demand value related to the required usage of a hardware component offering the second functionality; (vi) determining a second processor group average excess hardware capacity by averaging the third hardware component excess hardware capacity and the fourth hardware component excess hardware capacity; (l) upon determining that the first processor group average excess hardware capacity is larger than the second processor group average excess hardware capacity, scheduling and executing the software thread on the first processor group and skipping further steps in the method; and (m) upon determining that the second processor group average excess hardware capacity is larger than the first processor group average excess hardware capacity, scheduling and executing the software thread on the second processor group and skipping further steps in the method.

In a third aspect, an embodiment of the invention provides a tangible, non-transitory computer-readable information storage medium storing software for execution by one or more processors and when executed operable to implement the method provided in the first aspect above.

In a fourth aspect, an embodiment of the invention provides a tangible, non-transitory computer-readable information storage medium storing software for execution by one or more processors and when executed operable to implement the method provided in the second aspect above.

A further understanding of the nature and the advantages of particular embodiments disclosed herein may be realized by reference of the remaining portions of the specification and the attached drawings.

BRIEF DESCRIPTION OF THE DRAWINGS

Non-limiting and non-exhaustive embodiments of the present invention are described with reference to the drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

In a multi-processor system, such as a chip multithreaded (CMT) processor, conventional methods of software thread scheduling based on "software utilization" (running-thread-count) are no longer adequate. Strands (or central processing units (CPUs)) may share hardware resources such as an execution pipeline, a floating-point unit (FPU), and a first-level cache, etc., within a processor core. Processor cores may share hardware resources such as a second-level or third-level cache and/or memory controller within a processor chip, and processor chips may share hardware resources such as memory controllers and interconnects or busses with other processor chips. Some of the shared hardware resources may matter for performance. When such a performance-relevant shared hardware resource is overloaded, all strands using it—and consequently software threads executing on these strands—will suffer degraded performance as they compete for shared hardware resources. Current processor hardware provides hardware utilization information, for example through programmable CPU hardware performance counters (CPCs), enabling operating systems, hypervisors, or other management software to measure hardware resource usage or utilization, sample a thread's hardware resource consumption vector and estimate its hardware resource demand vector. By using this information, operating systems, hypervisors, other management software, or tools can improve thread or application scheduling decisions to minimize hardware resource contention, minimize power consumption, maximize execution efficiency, and improve overall application performance.

Terminology

This patent document defines a processor group (PG) as a collection of two or more CPUs (strands) that share at least one performance-relevant hardware component. Performance-relevant hardware components may include execution pipelines, translation lookaside buffers (TLB), floating-point units, graphics units, co-processors, cryptographic units, accelerators, cache, memory controllers, interconnects, etc. PGs may be organized in a hierarchy based on the processor topology of the machine. For example, strands of the same processor core sharing an execution pipeline and first-level cache may be modeled as leaf PGs; strands of groups of processor cores sharing a second- or third-level cache may be modeled as their parent; and strands in all processor cores of a chip sharing a common memory controller may be modeled as a root PG. The PG hierarchy may further be extended beyond a chip to describe a topology of a larger system.

This patent document uses the term non-uniform memory access (NUMA) for a system or machine has that "NUMA nodes", where each NUMA node contains at least some strands and local memory (and consequently a memory controller for the local memory). All strands can access all physical memory in the machine. However, strands can access local memory in their NUMA node faster than remote memory in other NUMA nodes, for which reason access is called non-uniform.

This patent uses the term hardware component or hardware resource to describe a hardware component that is, unless specifically stated otherwise, performance-relevant to one or more strands.

This patent document uses the term demand to refer to the amount, or predicted amount, to which a thread needs a resource. Note that a thread's demand of the resource may be larger than its actual consumption, especially when the thread competes for a shared resource with other threads. Relative demand is demand expressed as a fraction of capacity (see below).

This patent document uses the term consumption to refer to the amount to which a thread uses a resource.

This patent document uses the term hardware resource demand vector to refer to the amount of all performance-relevant hardware resources needed by a thread expressed as a list or vector describing the demand for each relevant hardware resource. Similarly, hardware resource consumption vector is the amount a thread actually consumes the hardware resources expressed as a list or vector describing the consumption of each relevant hardware resource. The software resource demand of a thread is typically one strand, unless, for example, it has been artificially "inflated" to give the thread priority. The software resource consumption of a thread is exactly one strand.

This patent document uses the term thread resource demand vector for a list or vector that includes entries for a thread's software resource demand and/or one or more hardware resource demands.

This patent document uses the terms capacity, usage, and utilization to refer to the maximum capacity a resource can provide (capacity); the amount to which a particular resource is used (usage); and the relative usage of a resource calculated as usage divided by capacity (utilization).

This patent document uses the term resource calculated usage to refer to the sum of the demands for that resource of all threads accessing the resource. Note that the resource calculated usage of a resource can exceed its capacity; in that case, the resource is called overloaded.

This patent document uses the term processor group calculated usage vector (PG calculated usage vector) to refer to a list or vector describing the aggregate demand from all threads currently executing on a PG for all its resources. The vector contains both the PG's software resource demand as well as the hardware resource demand vector that includes each of the PG's performance-relevant shared hardware components. For example, the resource calculated usage of a leaf PG comprising a processor core with multiple strands and a dedicated execution pipeline may be a vector that includes the software usage (running-thread count on this PG) and the execution pipeline demand (demand for issued instructions of all threads running on the PG). The resource calculated usage of a parent PG that includes multiple processor cores sharing a common second-level cache would comprise the aggregated resource calculated usage vectors of all child PGs as well as the demand of all threads running on that PG for the shared second-level cache. Likewise, the PG capacity is a list or vector describing the capacity of each of the PG's software and hardware resources. Note that the PG calculated usage vector can exceed the PG capacity if threads demand more hardware resources than available and shared hardware resources are overloaded.

This patent document uses the term software utilization to refer to the traditional "CPU utilization" of a system, processor group, or strand, defined as the number of currently running threads divided by the number of strands in the system or processor group.

This patent document uses the term hardware utilization to refer to the utilization of a particular hardware resource such as an execution pipeline, cache, or memory controller. For example, the utilization of an execution pipeline may be defined as the number of issued or committed instructions in a cycle divided by the issue width of the pipeline (the maximum number of instructions per cycle the pipeline can issue).

DETAILED DESCRIPTION OF THE DRAWINGS

Figure 1:
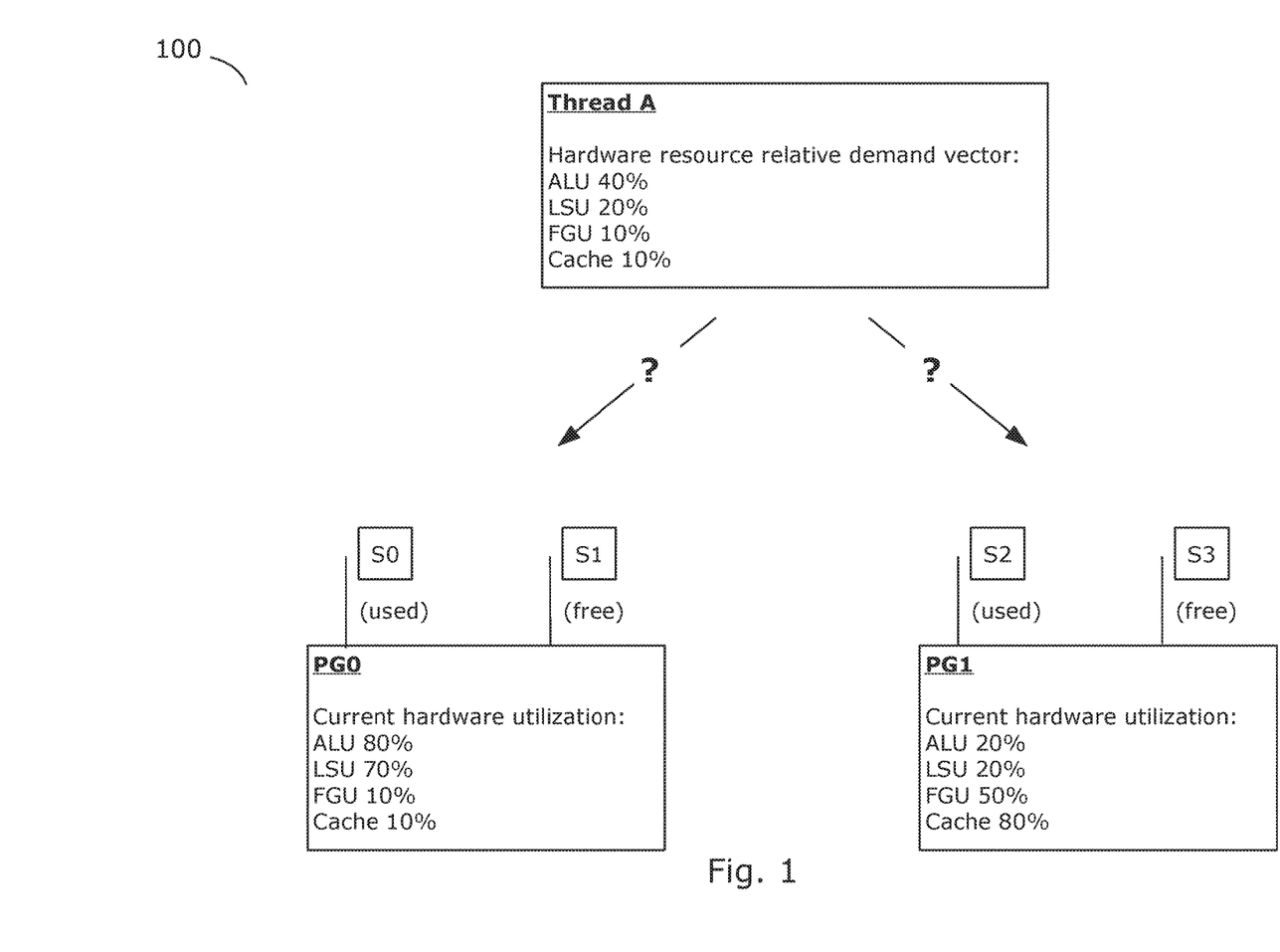
FIG. 1 illustrates a scheduling situation for a thread, with two processor groups of two strands each.

FIG. 1 illustrates a scheduling situation 100 for a thread A, with two processor groups of two strands each. Processor group PG0 includes strands S0, which is used, and S1, which is available. Processor group PG1 includes strands S2 (used) and S3 (available). A scheduler (not drawn), which may be or include a separate software process, must decide whether to schedule thread A on (available strand S1 in) PG0, or on (available strand S3 in) PG1. The scheduler detects a software utilization of 50% for each PG0 and PG1, since both have one used and one available strand. Therefore, based on software utilization alone, the scheduler would have no preference for scheduling thread A to PG0 over scheduling thread A to PG1. However, hardware utilization information provides further insight. A novel aspect of embodiments of the present invention is to combine the use of software and hardware utilization information for the thread scheduling process.

Thread A requires approximately 40% utilization of an arithmetic logic unit (ALU), 20% of a load store unit (LSU), 10% of a floating point and graphics unit (FGU) and 10% of cache memory. Utilization of these shared resources is very different in PG0 than in PG1. PG0 shows that a thread on strand S0 uses 80% of its ALU, 70% of its LSU, 10% of its FGU, and 10% of its cache resources, whereas PG1 shows that a strand on S2 uses 20% of its ALU, 20% of its LSU, 50% of its FGU, and 80% of its cache resources. Should thread A be scheduled on (S1 in) PG0, then the combined relative demand for the ALU would be 120%, which means that for approximately one sixth of the time the threads on strands S0 and S1 would be waiting for each other. This loss of performance would not occur if thread A is scheduled on (S3 in) PG1, since there none of the shared resources ALU, LSU, FGU, and cache would see a combined relative demand of 100% or greater. Once thread A is running on strand S3 concurrently with the thread already running on strand S2, the combined hardware utilization of PG1 becomes 60% for the ALU, 40% for the LSU, 60% for the FGU, and 90% for the cache.

For the scheduler to take hardware utilization into account, it needs to have access to information about the actual hardware capacity and usage, and it needs to know a thread's hardware resource demand vector. For the actual hardware utilization, the scheduler relies on availability of CPU hardware performance counters (CPCs) in the processor hardware. Using this information, embodiments of the invention provide a novel way to determine a thread's hardware resource demand vector and to schedule the thread, as will be explained in the following.

Figure 2:
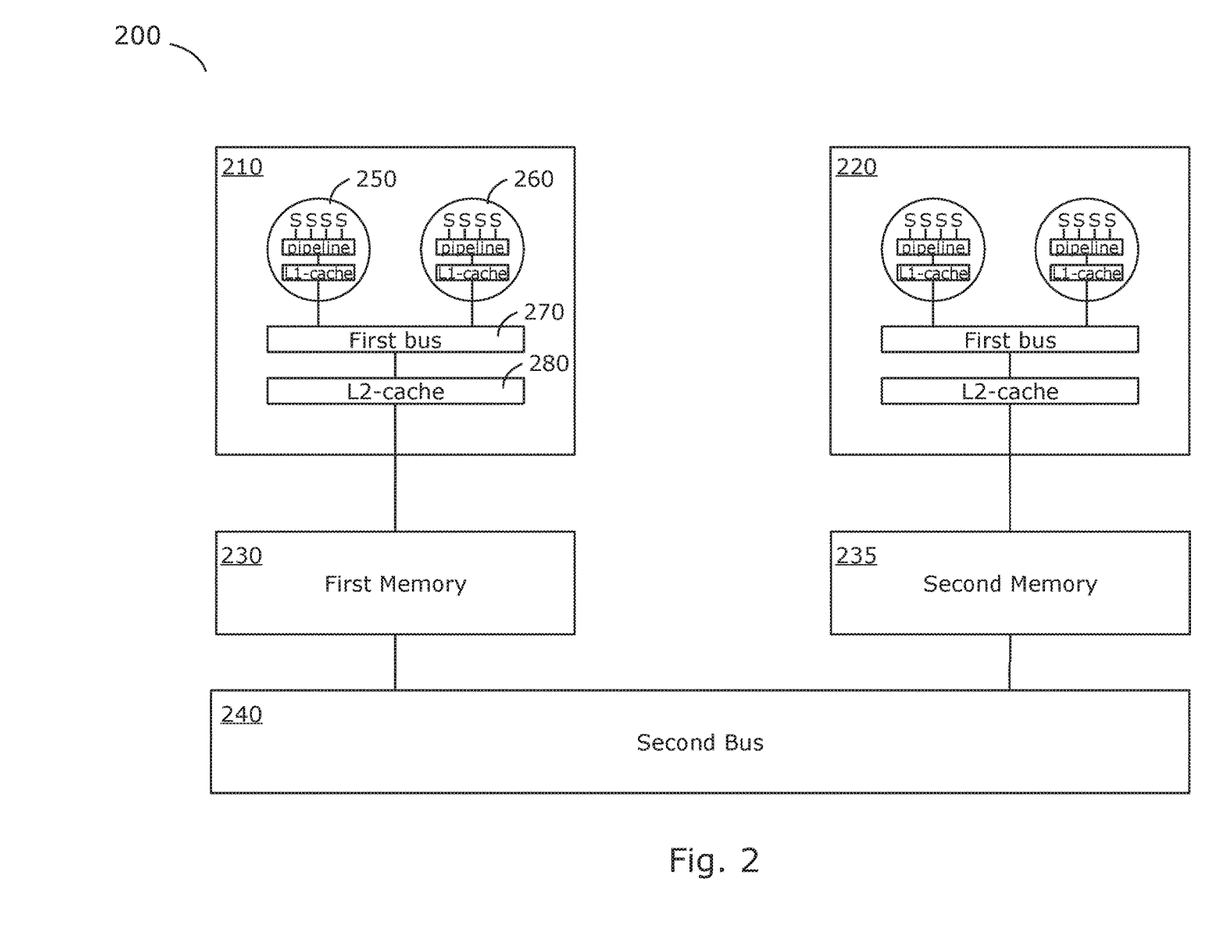
FIG. 2 illustrates an example multiprocessor system suitable for methods according to embodiments of the invention.

FIG. 2 illustrates an example multiprocessor system 200 suitable for methods according to embodiments of the invention. Multiprocessor system 200 includes chips 210 and 220. Chip 210 is coupled with first memory 230, and chip 220 is coupled with second memory 235. Both memories are coupled to each other via second bus 240. Chip 210 includes processor cores 250 and 260, which are both coupled with first bus 270, and via first bus 270 with level-2 cache 280. Processor cores 250 and 260 each include four strands, sharing an instruction pipeline and a level-1 cache. Chip 220 includes the same hardware as chip 210. As is evident from FIG. 2, second bus 240 is shared by all strands. The first and second memories, level-2 cache memories and first buses are each shared by eight strands. The instruction pipelines and level-1 cache memories are each shared by four strands. Multiprocessor system 200 illustrates a NUMA machine. It is capable of executing methods according to embodiments of the invention, and is capable of being managed by methods according to embodiments of the invention. Other multiprocessor topologies and systems, including a system formed by just chip 210 and first memory 230, or chip 220 and second memory 235, are equally suitable for methods according to embodiments of the invention.

Figure 3:
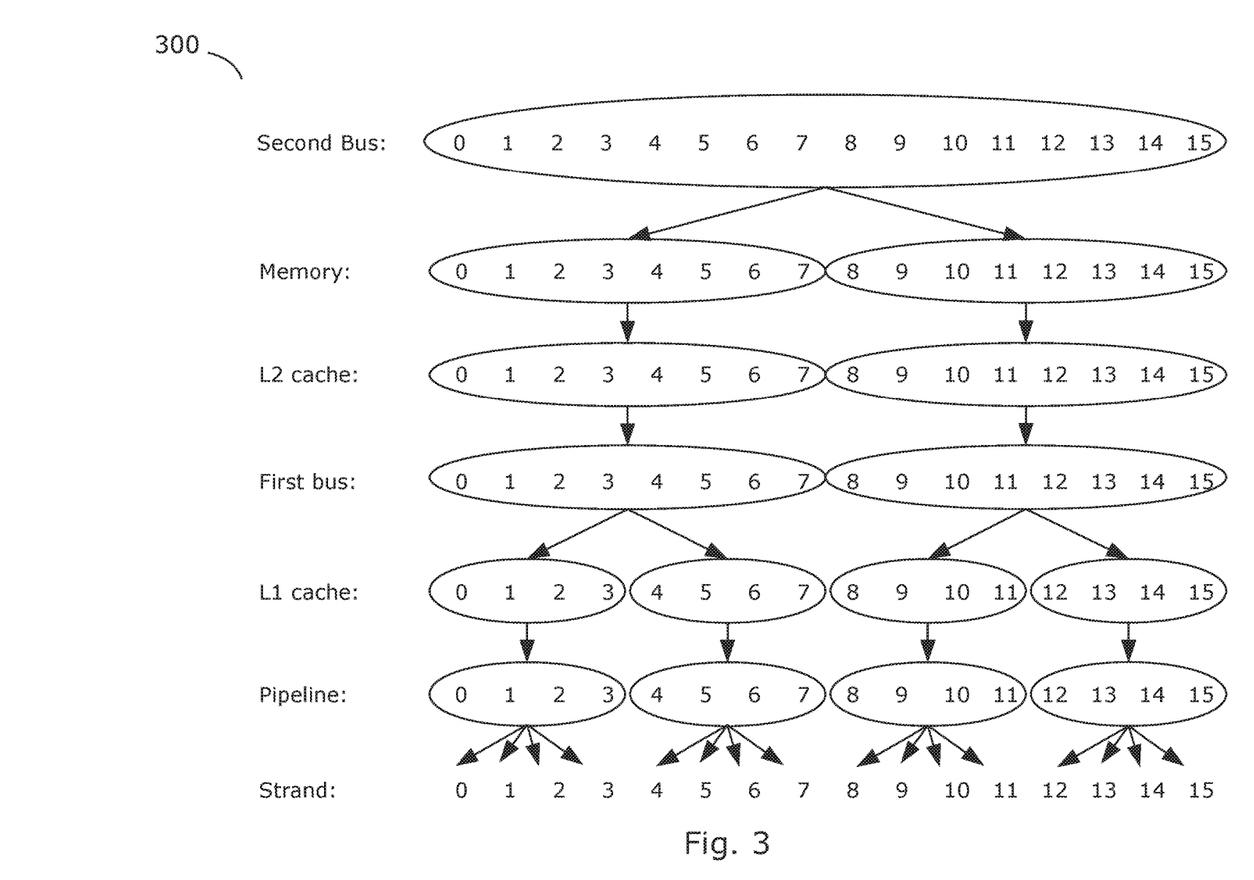
FIG. 3 illustrates a processor group topology that models the performance-relevant hardware sharing relationships in the multiprocessor system in FIG. 2.

FIG. 3 illustrates a processor group topology 300 that models the performance-relevant hardware sharing relationships in multiprocessor system 200 in FIG. 2. The hierarchy is shown with the highest hierarchical level at the top of the figure, and the lowest hierarchical level at the bottom of the figure, and is therefore vertically inverted from FIG. 2.

FIG. 3 shows the sixteen strands, numbered 0 through 15 in the bottom row. Strands 0-3 share an instruction pipeline and level-1 cache, strands 4-7 share another instruction pipeline and level-1 cache, strands 8-11 share a third instruction pipeline and level-1 cache, and strands 12-15 share a fourth pipeline and level-1 cache.

Strands 0-7 share first bus 270, level-2 cache 280 and first memory 230, whiles strands 8-15 share another first bus and level-2 cache, and second memory 235. All strands 0-15 share second bus 240.

Since strands 0-15 all share similar, but not all the same hardware components, strands of different processor cores may experience different hardware capacities and different hardware usages. A hardware component's usage depends on the aggregated consumption by threads sharing it.

Embodiments of the invention may model the hardware sharing relationships in FIG. 3 with processor groups at various hierarchical levels. At the highest hierarchical level is a root PG, including strands 0-15 that share the second bus. A level lower are two intermediate PGs. The first intermediate PG includes strands 0-7 that share the first memory, first level-2 cache, and first bus. The second intermediate PG includes strands 8-15 sharing the second memory, second level-2 cache, and second first bus. At the leaf level, there are four PGs, including strands 0-3, 4-7, 8-11, 12-15 which are sharing their respective instruction pipelines and level-1 cache memories. Some embodiments may further distinguish PGs at hierarchical sub-levels.

Figure 4:
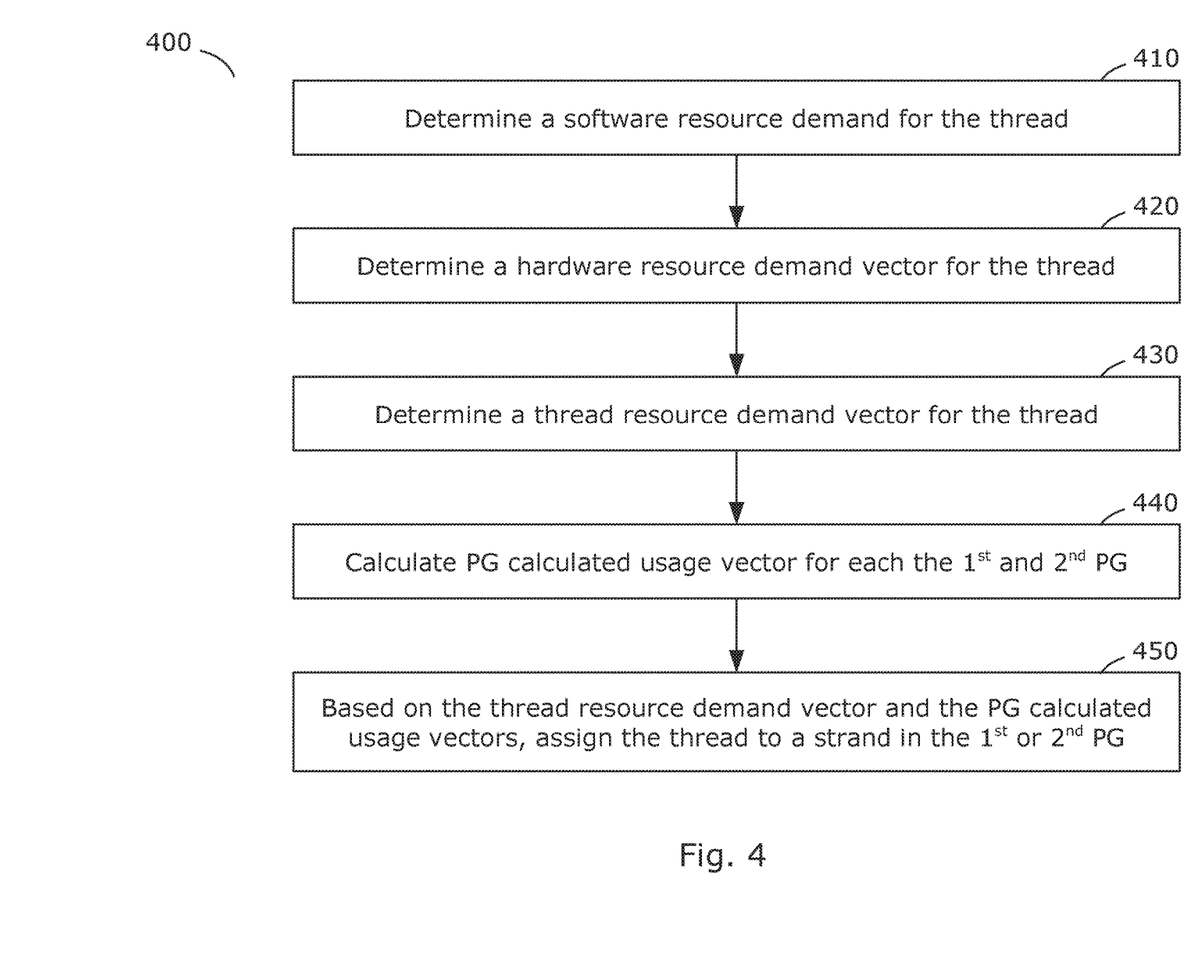
FIG. 4 illustrates a method for scheduling a first software thread on a hardware system according to embodiments of the invention.

FIG. 4 illustrates a method 400 for scheduling a first thread for execution on a hardware system according to embodiments of the invention. The hardware system includes at least a first PG with a first hardware component shared by at least a first strand and a second strand, and a second PG with a second hardware component shared by at least a third strand and a fourth strand, wherein each of the strands is capable of executing the first thread, and wherein the first and the second hardware components offer similar or equal functionality. Method 400 may be included in an operating system that is executed on the hardware system. Method 400 includes the following steps.

Step 410—For the first thread, determining a first software resource demand including a number of strands that needs to be available in the first or second processor group to execute the first thread. In most cases, the first software resource demand will have a value of one. In case the first thread is prioritized, the first software resource demand value may be inflated and greater than one. Some embodiments may determine a first software resource relative demand rather than a first software resource demand, and express the value as a percentage, or as a number representing a percentage range, as will be described below.

Step 420—For the first thread, determining a first hardware resource demand vector including an amount of usage needed of the functionality offered by the first and second hardware components. To determine the first hardware resource demand vector, an embodiment measures the first thread's consumption of the first or second hardware component while the first thread may be operational in the hardware system along with an optional second thread. In contrast to prior-art methods, embodiments of the invention do not need to execute the first thread in isolation to determine the first hardware resource demand vector. Neither do they need to run the first thread in an offline situation to learn the first hardware resource demand vector. Some embodiments wait before determining the first hardware resource demand vector until the first thread has run for at least a minimum number of times. Other embodiments may additionally update the first hardware resource demand vector at one or more later times and determine an average or a running average hardware resource demand vector. Yet further embodiments may determine additional first thread hardware resource demands for one or more additional (performance-relevant) hardware components. Embodiments may not determine and/or update the first hardware resource demand vector each time the first thread runs. Instead, determining and/or updating may occur less frequently, for example once every tenth time a first thread runs. Also, a frequency of determining and/or updating may not be constant. Some initial times a first thread runs, an embodiment may determine and/or update more often to quickly achieve statistical relevant information, whereas later the embodiment may reduce the frequency of determining and/or updating as information is already statistically relevant, and only needs to be maintained.

Some embodiments determine entries for a hardware resource demand vector based on usage information provided by the hardware system, and other embodiments determine entries for a hardware resource relative demand vector based on utilization information provided by the hardware system. CPCs may provide different types of usage or utilization information dependent on the resource type. For a strand, an execution pipeline, or an FPU, for example, a CPC may count the number of instructions. Some hardware components may execute one instruction per cycle, whereas other hardware components may execute multiple instructions per cycle. A formula to calculate a utilization percentage takes this into account. An embodiment may sample the first thread's total activity by programming and reading a CPC on the strand when the first thread starts execution, and then reading the same CPC when the first thread stops execution. The difference in CPC values measures the strand's activity during the time that the first thread has run on that strand, and consequently the activity of the first thread itself. Similarly, an embodiment may sample a CPC of the first or second hardware component, it may sample CPCs of other (performance-relevant) hardware components used by the first thread, and it may determine contention. A CPC may provide a count for the amount a hardware component has been used by a strand, and a count for the amount of contention the strand has experienced. For example, one CPC may count the number of cycles in which a strand was able to access a resource (usage), and another CPC may count the number of cycles a strand has waited to access the resource (contention).

For other resource types, embodiments may express the hardware usage or utilization differently. For example, usage or utilization of cache memory may be expressed in the number or percentage of cache memory lines occupied by the first thread (its active working set size). For a memory controller, the embodiment may express usage/utilization as the memory bandwidth (or percentage thereof) that the first thread consumes. Embodiments may measure usage or utilization of any other performance-relevant hardware component that allows for sampling its consumption, contention, and/or demand.

An embodiment may estimate hardware demand based on consumption of one or more hardware components and contention. For example, using relative numbers based on the information from CPCs, an embodiment may find that hardware utilization attributable to the first thread is 15% for an ALU, 7% for an LSU, 8% for a branch, and 5% for an FGU. It may also find that the first thread waits for the pipeline 20% of the cycles (a contention of 20%), and that it is stalled 45% of the cycles (waiting for hardware other than the included performance-relevant hardware components). The contention of 20% is because the pipeline is overloaded. Had it not been overloaded, then the pipeline would have worked for the first thread, or hardware components outside of the pipeline (lumped together as stalls). Therefore, the 20% should have been proportionally distributed over the pipeline hardware components and the stalls. Thus, each of the components would have been (100%)/80%=1.25 times larger. This results in a hardware relative demand of the first thread of 18.75%, 8.75%, 10%, and 6.25%, respectively.

By determining a thread's hardware resource demand vector repeatedly, an embodiment can gather statistics, including, for example, minimum, maximum, average, running average, median, total, last, and any other statistics that help characterize the first thread's behavior.

Step 430—For the first thread, determining a thread resource demand vector including entries for the first software resource demand and at least the first hardware resource demand. In some embodiments, the entries each represent a resource demand percentage or a resource demand percentage range. Embodiments may limit the accuracy of entries in a thread resource (relative) demand vector, for example by expressing each of the first software and hardware resource (relative) demand vectors as a digital number with a limited number of bits. The limited number of bits may be three, or any other number that expresses the profile with sufficient but not irrelevant accuracy. By limiting the accuracy, the entries represent a software or hardware resource demand vector as a number or as a percentage range of the capacity. For example, in the case of three bits' accuracy, a first range may represent a required capacity of 12.5% and less, a second range represents a required capacity of 12.5 to 25%, and so on.

Step 440—For each the first and the second processor group, calculating a PG calculated usage (or utilization) vector that includes an entry representing an aggregate software resource demand for its at least two strands and an entry representing an aggregate hardware resource demand for the functionality offered by the first and second hardware components. An embodiment may calculate the PG calculated usage vector for each software resource (strand) or hardware resource by adding the relevant resource demands of threads utilizing the software or hardware resource.

Some relevant resource demands may be known from steps 410 through 430. Others may not be known, for example for short-lived threads, or threads that are young and whose consumption of relevant resources has not been determined yet. For those threads, an embodiment may add a minimum default value for each relevant resource demand, for example one percentage range step. Since threads start and finish often, the resulting hardware utilization changes often. An embodiment may add a resource demand to a member of the PG calculated usage vector when one of the threads starts executing and may subtract a resource demand from a member of the PG calculated usage vector when one of the threads stops executing. An embodiment may calculate a total hardware demand for each single performance-relevant hardware component in the first and the second processor group, and it may calculate total usage for all similar performance-relevant hardware components in each the first and the second processor group.

As an example, a processor group may include a total of eight strands and shared resources that include the following components: ALU, LSU, Branch, and FGU. An embodiment calculates a PG calculated utilization vector that includes relative entries with 3 bits' accuracy (i.e., aggregated resource demands for each relevant shared hardware component is expressed as a number from 1 to 8, each increment representing a 12.5% range). For each of four active threads there is a thread resource demand vector that includes the following components: CPU, ALU, LSU, Branch, and FGU. ("CPU" stands for the thread's software requirement, and a value of 1 in this context means the thread requires from 0 to 12.5% of the available strands, in casu, exactly one strand.) Suppose the following thread resource relative demand vectors:

Thread 0: [CPU=1, ALU=2, LSU=1, Branch=1, FGU=1]
Thread 1: [CPU=1, ALU=4, LSU=0, Branch=0, FGU=0]
Thread 2: [CPU=1, ALU=1, LSU=1, Branch=0, FGU=0]
Thread 3: [CPU=1, ALU=1, LSU=1, Branch=1, FGU=0]

The embodiment calculates the PG calculated utilization vector by adding all thread resource relative demand vector entries:

Processor group: [CPU=4, ALU=8, LSU=3, Branch=2, FGU=1]

In a hierarchical PG topology, some hardware resources may be shared by all strands, other hardware resources may be shared by a portion of the strands, yet other hardware resources may be shared by a smaller portion of the strands, etc. Such a PG topology may be modeled with a tree of hardware sharing relationships such as shown in FIG. 3. An embodiment may calculate the hardware resource demand vector for all hardware components shared by a processor group. Methods for this calculation have been presented in the earlier U.S. Pat. No. 8,156,495, "Scheduling Threads on Processors", by Chew and Saxe.

Step 450—Based on the first processor group PG calculated usage vector and the second processor group PG calculated usage vector, or PG calculated utilization vectors, and based on the thread resource demand vector, assigning the first thread to either a strand in the first processor group or a strand in the second processor group. An embodiment optimizes first thread scheduling considering software and hardware utilization as anticipated in the PG calculated usage vectors for the first and the second processor group. An embodiment may compare a thread resource demand vector with the PG calculated usage vector for any PG that is being considered as a location for the thread to run. The embodiment searches for a PG with an available strand where the first thread can run and will have all hardware resources it needs or, if not available, as close to those as possible (e.g., a PG with the lowest software and hardware utilization).

An embodiment may use a strategy for optimized first thread scheduling in which it compares the PG calculated usage vectors of two or more PGs with the first thread resource demand vector. If possible, the embodiment will choose a PG where (a) the first thread can run immediately; or (b) no hardware component exceeds its maximum capacity when running the first thread; or (c) the utilization is lowest.

Whereas some embodiments implement method 400 using absolute values for demand, usage, and capacity, other embodiments use relative values that may be obtained by dividing usage by capacity (resulting in utilization) and by dividing demand by capacity (resulting in relative demand). To calculate a PG calculated utilization vector of an intermediate or high-level PG, percentages from constituent hardware components at lower levels in the hierarchy may add up or consolidate otherwise. For example, the PG in FIG. 3 that includes strands 0-7 includes only one hardware component for each the first bus, the first level-2 cache, and the first memory. But it includes two level-1 caches, and two execution pipelines. If each level-1 cache has a utilization of 80% and they are of equal size, the resulting level-1 cache utilization is 80%, not 160%. Embodiments take the combined capacity into account when consolidating hardware resources utilization and relative demands.

Figure 5:
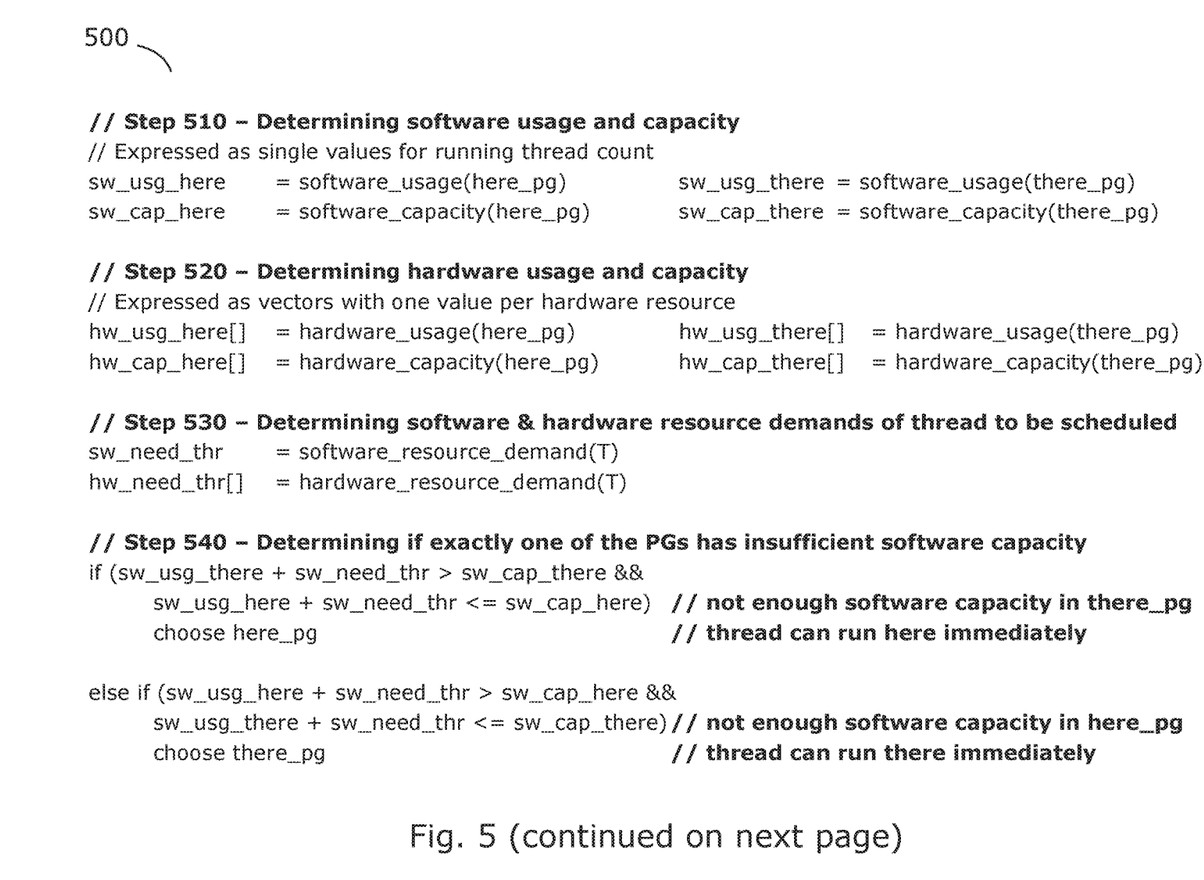
FIG. 5 illustrates an example pseudo-code implementation for scheduling a first software thread for execution on a hardware system according to an embodiment of the invention.

FIG. 5 illustrates an example pseudo-code implementation 500 of a method for scheduling a first thread for execution on a hardware system according to an embodiment of the invention. FIG. 5 spans two pages. The hardware system is modeled in a first processor group (PG here (here_pg)) and a second processor group (PG there (there_pg)). Method 500 compares the first thread's needs with the software and hardware usage and capacity of here_pg and there_pg. The first PG has access to at least a first hardware component and the second PG has access to at least a second hardware component. Both the first and the second hardware component offer a first functionality. Although the example embodiment compares two processor groups, other embodiments may compare more than two processor groups. And, although the example embodiment uses absolute values for usage and capacity, other embodiments may use relative values. The method includes the following steps.

Step 510—Determining software usage and capacity. For both the first processor group and the second processor group, the embodiment determines software usage and capacity. The usages and capacities may include single values, for example running thread counts, or they may include lists or vectors with various further usage aspects, for example scheduled duration.

Step 520—Determining hardware usage and capacity. For both the first processor group and the second processor group, the embodiment determines hardware usage and capacity. The example embodiment that is illustrated represents usages and capacities by vectors, where the vectors include at one value per hardware component. Other embodiments may include multiple values per hardware component to, for example, include statistically relevant information.

Step 530—Determining the first thread's software and hardware resource demand vectors. Some embodiments may determine these as separate entities, whereas other embodiments may combine the two into a thread resource demand vector.

Step 540—Determining if exactly one of the PGs has insufficient software capacity. If the second PG software usage plus the first thread's software demand is larger than the second PG's software capacity, and the first PG's software usage plus the first thread's software demand is smaller than or equal to the first PG's software capacity, then the embodiment first PG may schedule the first thread on a strand in the first PG. Else, if the first PG software usage plus the first thread's software demand is larger than the first PG's software capacity, and a second PG's software usage plus the first thread's software demand is smaller than or equal to the second PG's software capacity, then the embodiment may schedule the first thread on a strand in the second PG. In either case, the embodiment skips steps 550-570. If neither is the case, this example embodiment proceeds with step 550.

Step 550—Determining if one of the PGs has less hardware resource contention than the other. Contention is caused by usage and additional demand exceeding a hardware component's capacity. Therefore, the example embodiment calculates the maximum hardware resource contention for each the first PG and the second PG by subtracting, for each hardware component, the hardware component's capacity from its current usage plus the first thread's needs. The embodiment determines the maximum of the hardware component contentions for all hardware components within the first PG and the maximum of the hardware component contentions for all hardware components within the second PG. The embodiment determines if one maximum is lower than the other (the PG has less contention than the other). If so, the embodiment chooses the PG with the lowest maximum contention and skips steps 560-570. If not, the maximums are equal and this example embodiment proceeds with step 560.

Step 560—Determining whether one of the PGs has better average excess hardware capacity than the other. Excess hardware capacity means the unused capacity on a hardware resource once the first thread has been added to it and it can be calculated by taking the hardware resource's capacity, minus its current usage, and minus the first thread's needs for the hardware resource. For all hardware resources available to each PG, the example embodiment calculates the average excess hardware capacity. The embodiment determines the excess capacities of all hardware components available to the first PG and calculates the average thereof. It determines the excess capacities of all hardware components available to the second PG and calculates the average thereof. The embodiment determines whether one average is lower than the other. If so, the embodiment chooses the PG with the higher average excess hardware capacity and skips step 570. If not, this example embodiment proceeds with step 570.

Step 570—Selecting the PG with the lowest software usage. If the embodiment has proceeded to this method step 570, then both PGs have equal maximum resource contention and equal average excess hardware capacity. Both PGs have either sufficient or insufficient software capacity. The embodiment selects the PG with the lowest software usage compared to its capacity.

Although the description has been described with respect to particular embodiments thereof, these particular embodiments are merely illustrative, and not restrictive. For example, the drawings present an example hardware system for which embodiments of the invention are suitable. However, embodiments can equally well handle other hardware architectures with different numbers of strands in a processor core, different shared performance-relevant hardware resource in or across processor cores or chips, etc., and different shared hardware resources in a processor group. Embodiments may be implemented in software, supported by the underlying hardware, and embodiments may be implemented in hardware, supported by embedded or otherwise available software. Methods may focus more on one or another aspect of resource demands, and on one or another aspect of resource capacity, usage, and/or availability. Embodiments may equally well implement the methods with absolute values, relative values, and numbers indicating ranges of absolute or relative values. Method steps may be skipped, expanded upon, or reordered. Software implementations may run as part of an operating system on the hardware upon which it schedules threads, or they may run as independent software on different hardware. Hardware implementations may use dedicated registers, counters, adders, and/or subtractors to store and process variables and constants used in the methods.

Any suitable programming language can be used to implement the routines of particular embodiments including C, C++, Java, assembly language, etc. Different programming techniques can be employed such as procedural or object oriented techniques. The routines can execute on a single processing device or multiple processors. Although the steps, operations, or computations may be presented in a specific order, this order may be changed in different particular embodiments. In some particular embodiments, multiple steps shown as' sequential in this specification can be performed at the same time.

Particular embodiments may be implemented in a tangible, non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, application specific integrated circuits, programmable logic devices, field programmable gate arrays, optical, chemical, biological, quantum or nanoengineered systems, components, or mechanisms. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory.

The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for scheduling a first software thread for execution on a hardware system comprising at least a first processor group and a second processor group, wherein each of the processor groups comprises at least two strands each capable of executing the first software thread, and wherein the first processor group has access to a first hardware component and the second processor group has access to a second hardware component, the first and second hardware components each offering a first functionality via their processor groups' respective strands, the method comprising:

for the first software thread, determining a first software resource demand including a count of strands that needs to be unused and available in a processor group to execute the first software thread;

for the first software thread, determining a first functionality hardware resource demand including an amount of usage needed of the first functionality, wherein the determining occurs while the first software thread is operational in the hardware system without isolating the first software thread from an optional second software thread that is operational on the hardware system along with the first software thread and the determining uses usage information provided by the hardware system;

for the first software thread, after the first software thread has run at least a minimum number of times, determining a thread resource demand vector including an entry for the first software resource demand and an entry for the first functionality hardware resource demand, and correcting the entries for contention;

for each the first processor group and the second processor group, determining a calculated usage vector that includes an entry representing a count of used strands and an entry representing an aggregated usage of the first functionality;

for each the first processor group and the second processor group, determining a capacity vector that includes an entry representing a count of total strands and an entry representing a capacity of the first functionality; and based on the first processor group calculated usage vector and capacity vector, and the second processor group calculated usage vector and capacity vector, and based on the thread resource demand vector, assigning the first software thread to one of a strand in the first processor group and a strand in the second processor group and executing the first software thread on the strand to which the first software thread is assigned.

2. The method of claim 1, wherein the method is included in an operating system that is executed on the hardware system.

3. The method of claim 1, wherein the calculated usage vector and the capacity vector are combined in a calculated utilization vector that includes an entry with utilization information calculated as the aggregate usage of the first functionality divided by the capacity of the first functionality.

4. The method of claim 3, wherein utilization information is stored as a number representing a percentage range.

5. The method of claim 1, further comprising:

for the first software thread, determining a second functionality hardware resource demand including an amount of usage needed of a second functionality, wherein the determining occurs while the first software thread is operational in the hardware system along with at least a third software thread and the determining uses usage information provided by the hardware system;

including an entry for the second functionality hardware resource demand in the thread resource demand vector; and including entries in the calculated usage vector and the capacity vectors representing aggregated usages and capacities of the second functionality.

6. The method of claim 1, wherein determining the thread resource demand vector occurs after the first software thread has run at least a minimum number of times.

7. The method of claim 1, further comprising updating the thread resource demand vector.

8. The method of claim 1, further comprising determining the thread resource demand vector multiple times to include statistically relevant information.

9. The method of claim 8, wherein the statistically relevant information includes at least one of a minimum, a maximum, an average, a running average, a median, a total, or a last.

10. The method of claim 8, wherein a frequency of determining the thread resource demand vector varies.

11. The method of claim 1, wherein the usage information is provided by one or more hardware performance counters.

12. The method of claim 11, wherein determining the thread resource demand vector includes sampling values of a hardware performance counter when the first software thread starts and when the first software thread stops execution and calculating a difference between the sampled values.

13. The method of claim 11, wherein determining the thread resource demand vector includes correcting for contention.

14. The method of claim 11, wherein one of the one or more hardware performance counters provides a count of one of a number of instructions, a number of cache lines, and a number of bytes for a hardware component.

15. The method of claim 11, wherein one of the one or more hardware performance counters provides a number other than a count of one of a number of instructions, a number of cache lines, and a number of bytes for a hardware component.

16. The method of claim 1, wherein the entry representing an aggregated usage of the first functionality is calculated by adding demands of software threads presently using the hardware component offering the first functionality to a processor group.

17. The method of claim 16, wherein the aggregated usage includes a default value for a thread whose demands are unknown.

18. A tangible, non-transitory computer-readable information storage medium storing software for execution by one or more processors and when executed operable to schedule a first software thread for execution on a hardware system comprising at least a first processor group and a second processor group, wherein each of the processor groups comprises at least two strands each capable of executing the first software thread, and wherein the first processor group accesses a first hardware component and the second processor group accesses a second hardware component, the first and second hardware components each offering a first functionality via their processor groups' respective strands, the software comprising the following steps:

for the first software thread, determining a first software resource demand including a count of strands that needs to be unused and available in a processor group to execute the first software thread;

for the first software thread, determining a first functionality hardware resource demand including an amount of usage needed of the first functionality, wherein the determining occurs while the first software thread is operational in the hardware system without isolating the first software thread from an optional second software thread that is operational on the hardware system along with the first software thread and the determining uses usage information provided by the hardware system;

for the first software thread, after the first software thread has run at least a minimum number of times, determining a thread resource demand vector including an entry for the first software resource demand and an entry for the first functionality hardware resource demand, and correcting the entries for contention;

for each the first processor group and the second processor group, determining a calculated usage vector that includes an entry representing a count of used strands and an entry representing an aggregated usage of the first functionality;

for each the first processor group and the second processor group, determining a capacity vector that includes an entry representing a count of total strands and an entry representing a capacity of the first functionality; and based on the first processor group calculated usage vector and capacity vector, and the second processor group calculated usage vector and capacity vector, and based on the thread resource demand vector, assigning the first software thread to one of a strand in the first processor group and a strand in the second processor group and executing the first software thread on the strand to which the first software thread is assigned.

* * * * *